(12) United States Patent
Tamai et al.

(10) Patent No.: US 7,952,738 B2
(45) Date of Patent: May 31, 2011

(54) IMAGE PROCESSING APPARATUS, METHOD OF INSTALLING AN APPLICATION THEREIN, AND PROGRAM INSTALLING AN APPLICATION THEREIN

(75) Inventors: Yoshiyuki Tamai, Itami (JP); Kazumi Sawayanagi, Itami (JP); Takeshi Minami, Amagasaki (JP); Hidetaka Iwai, Itami (JP)

(73) Assignee: Konica Minolta Business Technologies, Inc., Chiyoda-Ku, Tokyo (JP)

(*) Notice: Subject to any disclaimer, the term of this patent is extended or adjusted under 35 U.S.C. 154(b) by 1180 days.

(21) Appl. No.: 11/634,235

(22) Filed: Dec. 6, 2006

(65) Prior Publication Data
US 2007/0263083 A1 Nov. 15, 2007

(30) Foreign Application Priority Data
Apr. 20, 2006 (JP) ................................ 2006-116371

(51) Int. Cl.
*G06F 3/12* (2006.01)
*G06K 15/00* (2006.01)
(52) U.S. Cl. ..................... 358/1.15; 358/1.13; 358/1.14; 358/1.16; 358/1.17
(58) Field of Classification Search ........ 358/1.11–1.18; 399/8, 77; 709/217, 219
See application file for complete search history.

(56) References Cited

U.S. PATENT DOCUMENTS

| | | | | |
|---|---|---|---|---|
| 5,678,135 A | * | 10/1997 | Fukui et al. | 399/77 |
| 6,115,741 A | * | 9/2000 | Domenikos et al. | 709/217 |
| 6,603,571 B1 | | 8/2003 | Nomoto | |
| 6,668,376 B1 | | 12/2003 | Wang et al. | |
| 6,771,385 B1 | * | 8/2004 | Iizuka et al. | 358/1.15 |
| 6,943,906 B2 | | 9/2005 | Murata | |
| 6,963,698 B2 | * | 11/2005 | Kondo | 399/8 |
| 7,137,099 B2 | * | 11/2006 | Knight et al. | 717/100 |
| 7,685,285 B2 | * | 3/2010 | Yamakoshi et al. | 709/226 |
| 2001/0055125 A1 | * | 12/2001 | Yamada et al. | 358/1.15 |
| 2002/0002630 A1 | * | 1/2002 | Nomura et al. | 709/310 |
| 2002/0054326 A1 | * | 5/2002 | Morita | 358/1.15 |
| 2002/0140966 A1 | * | 10/2002 | Meade et al. | 358/1.15 |
| 2003/0217065 A1 | | 11/2003 | Yokota | |
| 2004/0109188 A1 | * | 6/2004 | Akiyoshi et al. | 358/1.13 |
| 2004/0117464 A1 | | 6/2004 | Mae et al. | |
| 2005/0046887 A1 | | 3/2005 | Shibata et al. | |
| 2006/0230398 A1 | | 10/2006 | Yokota | |

FOREIGN PATENT DOCUMENTS

JP 2001-268306 A 9/2001
(Continued)

OTHER PUBLICATIONS

Notification of Reasons for Refusal in JP 2006-116371 dated May 20, 2008, and English Translation thereof.

*Primary Examiner* — James A Thompson
*Assistant Examiner* — Satwant K Singh
(74) *Attorney, Agent, or Firm* — Buchanan Ingersoll & Rooney PC

(57) ABSTRACT

Provided is an image processing apparatus, comprising a first function-judging unit of judging the function used by an installed application, a second function-judging unit of judging the functions available in the device, and a control unit of terminating and/or eliminating the function unused by the installed application, based on the results obtained in the first function-judging unit and the second function-judging unit when the application is installed.

24 Claims, 15 Drawing Sheets

FOREIGN PATENT DOCUMENTS

| | | |
|---|---|---|
| JP | 2001-306278 A | 11/2001 |
| JP | 2001-337830 A | 12/2001 |
| JP | 2001-337852 | 12/2001 |
| JP | 2002-297525 A | 10/2002 |
| JP | 2004-005419 | 1/2004 |
| JP | 2004-127281 A | 4/2004 |
| JP | 2004-334497 | 11/2004 |
| JP | 2005-080019 A | 3/2005 |

* cited by examiner

API symbol table A

| Symbol name | External/Internal | Address (internal) | IP address (external) |
|---|---|---|---|
| pdfConvert | Internal | 0xC000AB00 | — |
| tiffConvert | Internal | 0xC000ABF0 | — |
| jpegConvert | Internal | 0xC000CB00 | — |

FIG.12

API symbol table B

| Symbol name | External/Internal | Address (internal) | IP address (external) |
|---|---|---|---|
| pdfConvert | External | — | 192. 168. 0. 5 |
| tiffConvert | Internal | 0xC000ABF0 | — |
| jpegConvert | Internal | 0xC000CB00 | — |

FIG.13

IMAGE PROCESSING APPARATUS, METHOD OF INSTALLING AN APPLICATION THEREIN, AND PROGRAM INSTALLING AN APPLICATION THEREIN

This application claims priority under 35 U.S.C. §119 to Japanese Patent Application No. 2006-116371 filed on Apr. 20, 2006, the entire disclosure of which is incorporated herein by reference in its entirety.

BACKGROUND OF THE INVENTION

1. Field of the Invention

The present invention relates to an image processing apparatus operating by an application installed such as MFP (Multi Function Peripheral), a method of installing the application used in the image processing apparatus, and an installing program stored on a computer readable medium to make a compute in the image processing apparatus execute the processing of installing an application.

2. Description of the Related Art

The following description sets forth the inventor's knowledge of related art and problems therein and should not be construed as an admission of knowledge in the prior art.

For example, when various applications such as image-converting application are installed and operated in a multi-functional digital processing machine MFP, it is often difficult to install the applications because of the shortage in storage region needed for installation and to operate the applications because of the shortage in the memory range needed for operation. In addition, it is occasionally difficult to run the applications because of the shortage in processing capacity of MFP, lower operational speed, or lower efficiency in use.

When there is insufficiently resource available in MFP as described above, the manager often replaces the applications seldom used or turns off or eliminates the applications not in use manually, and reinstalls applications according to the condition of the apparatus.

On the other hand, methods of obtaining information on the applications used, judging the possibility of installing an application in the apparatus based on the application information, displaying the information on the operational panel for selection of installable applications are conventionally known for such apparatuses (for example, Japanese Unexamined Laid-open Patent Publication No. 2004-127281).

However, it is quite laborsome to exchange applications, removing unused functions manually, or removing and reinstalling application manually according to the condition of the device, when there is restriction in the resource of the device such as memory capacity and processing capacity as in conventional devices. It is because it is necessary to eliminate and reinstall applications several times for installation, if there is no information on the resource for storage of existing applications and the resource for storage and operation of the applications to be installed. Even if the resource is secured, when operation of the functions is turned off or applications are eliminated, the application to be installed may not be sufficiently used when installed, if the application uses the functions or the applications above.

In addition, by the method described in Japanese Unexamined Laid-open Patent Publication No. 2004-127281, it is possible to select installable applications on the display panel, but the usable functions are limited to the functions of installable applications, and thus, the efficiency in use is lower.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The Preferred embodiments of the present invention can significantly improve upon existing methods and/or apparatuses.

An object of the present invention is to provide an image processing apparatus allowing automatically installation of applications and favorable operation thereof and higher in the efficiency in use even if there is limitation in the resource of the device, without need for additional applications or termination of some of the functions according to condition.

Another object of the present invention is to provide a method of installing an application executed in the image processing apparatus.

Yet another object of the present invention is to provide an installation program stored on a computer readable medium to make a compute in the image processing apparatus execute the processing of installing an application.

A first aspect of the present invention is an image processing apparatus, comprising
a first function-judging unit of judging the function used by an installed application,
a second function-judging unit of judging the functions available in the device, and
a control unit of terminating and/or eliminating the function unused by the installed application, based on the results obtained in the first function-judging unit and the second function-judging unit when the application is installed.

A second aspect of the present invention is an image processing apparatus, comprising
an API judging unit of judging the API used by the installed application,
a function-judging unit of judging the functions available in the device, and
a control unit of terminating and/or eliminating the functions of the API unused by the installed application based on the judgment results obtained in the API-judging unit and the function-judging unit when the application is installed.

A third aspect of the present invention is a method of installing an application in an image processing apparatus, comprising
a step of judging the function used by the installed application,
a step of judging the functions available in the device, and
a control step of terminating and/or eliminating the function unused by the installed application based on the judgment results in the respective judging steps after the application is installed.

A fourth aspect of the present invention is a method of installing an application in an image processing apparatus, comprising
a step of judging the API used by the installed application,
a step of judging the functions available in the device, and
a control step of terminating and/or eliminating the function of the API unused by the installed application based on the judgment results in the respective judging steps after the application is installed.

A fifth aspect of the present invention is a program stored on a computer readable medium for installing an application for making a compute in an image processing apparatus execute processing, comprising
a step of judging the function used by the installed application,
a step of judging the functions available in the device, and
a control step of terminating and/or eliminating the function unused by the installed application based on the judgment results in the respective judging steps after the application is installed.

A sixth aspect of the present invention is a program stored on a computer readable medium for making a compute in an image processing apparatus execute processing, comprising
a step of judging the API used by the installed application,
a step of judging the functions available in the device, and
a control step of terminating and/or eliminating the function of the API unused by the installed application based on the judgment results in the respective judging steps after the application is installed.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which:

FIG. 11 is a flowchart showing the subroutine of the processing for changing from the API internal use mode to external reference mode in the flowchart shown in FIG. 7;

FIG. 12 is the symbol table of an API;

FIG. 13 is the symbol table of another API;

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
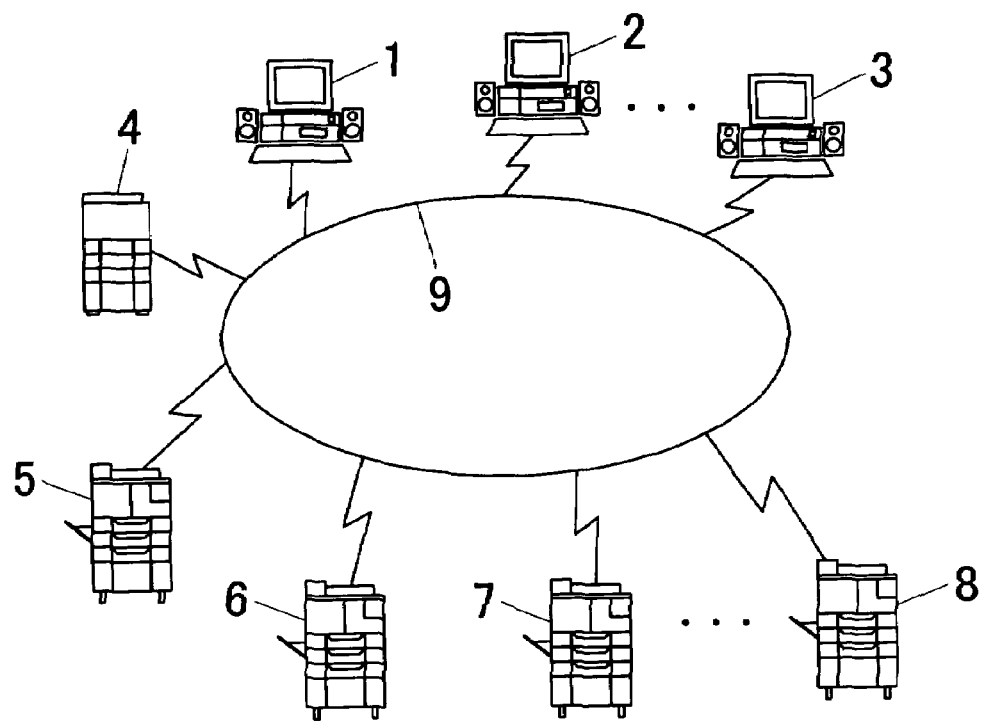
FIG. 1 is a network chart illustrating an image processing system having the image processing apparatus in an embodiment of the present invention.

FIG. 1 is a network chart illustrating an image processing system having the image processing apparatus in an embodiment of the present invention.

In FIG. 1, the image processing system includes, for example, multiple image processing apparatuses MFP's 5 to 8, a server 4, and multiple terminal devices 1 to 3, for example of personal computer (PC), wherein the multiple MFP's 5 to 8, the server 4, and the terminal devices 1 to 3 are connected to each other via a network 9 such as of LAN.

Each of MFP's 5 to 8 is a multifunctional digital processing machine having functions as copying machine, printer, facsimile, scanner and others and having the same configuration, and MFP 5 will be described as an example in the description below.

Figure 2:
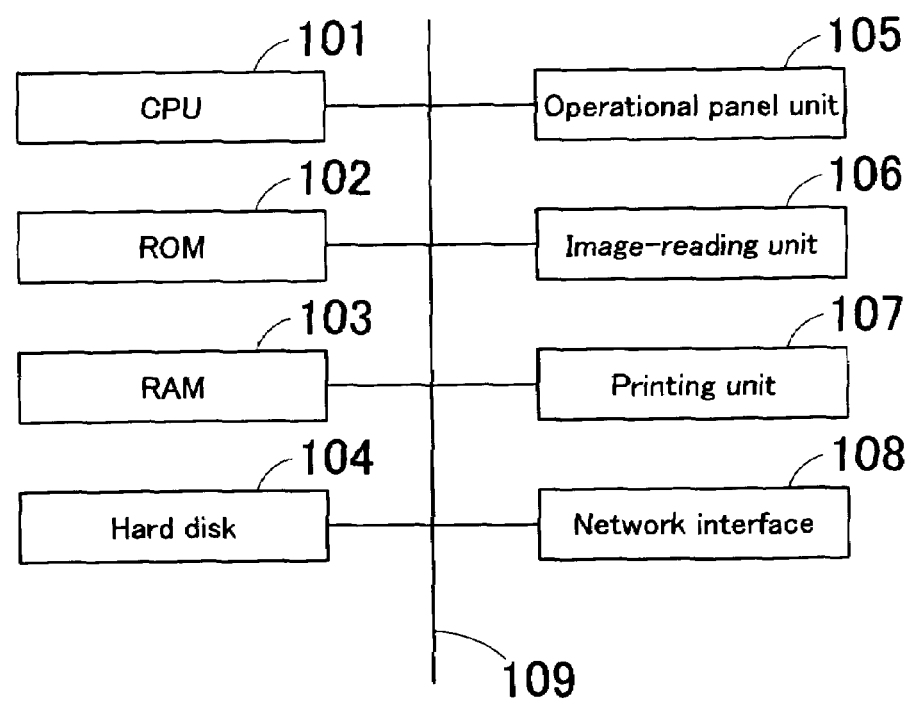
FIG. 2 is a block diagram showing the electrical configuration of an image processing apparatus MFP.

FIG. 2 is a block diagram showing the electrical configuration of MFP 5.

In FIG. 2, MFP 5 has, for example, a CPU 101, a ROM 102, a RAM 103, a hard disk 104, an operational panel unit 105, an image-reading unit 106, a printing unit 107, and a network interface unit 108. The ROM 102, RAM 103, hard disk 104, operational panel unit 105, image-reading unit 106, printing unit 107 and network interface 108 are connected to the bus 109 of CPU 101.

The CPU 101 controls the entire operation of MFP 5 and executes a particular installation processing when application software is installed in MFP 5. The specific processing will be described below.

The ROM 102 is a memory storing the operational program of CPU, and the RAM 103 is a memory used as the operational area for CPU 101.

The hard disk (HDD) 104 is a memory means storing image data and job data and also storing installed applications.

The operational panel unit 105 has a key input unit and a liquid-crystal display unit (both not shown in Figure) for input of various operations and mode selection.

The display unit is made, for example, of a touch panel.

The image-reading unit 106 has a function as scanner to read, for example, a document image. The printing unit 107 prints image data on paper according to the job condition instructed.

The network interface 108 functions as a communication unit for communicating data among other MFP's 6 to 8, server 4, and terminal devices 1 to 3 on the network 9.

Figure 3:
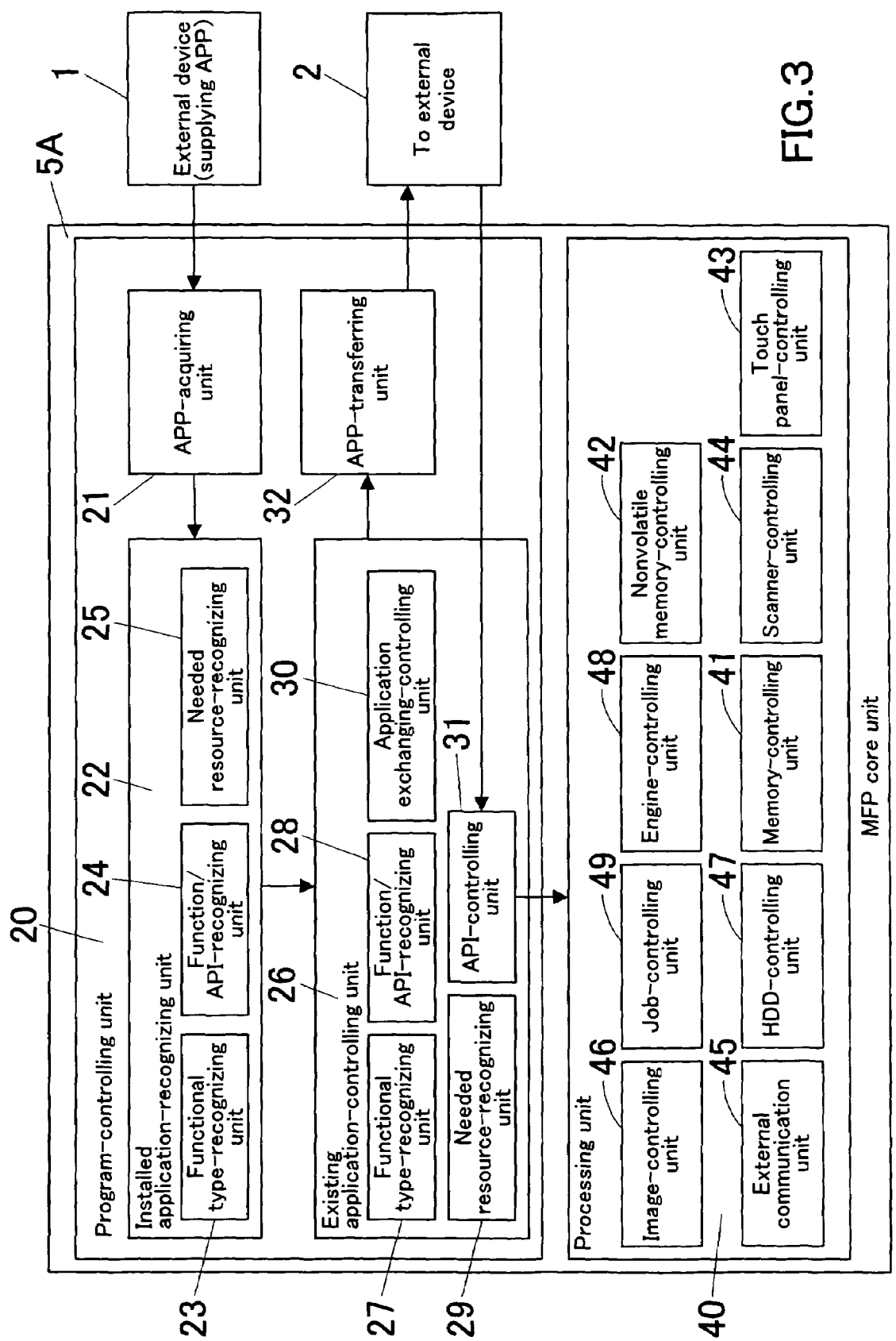
FIG. 3 is a functional block diagram showing the configuration of a controlling unit having the CPU of MFP.

FIG. 3 is a functional block diagram showing the configuration of the controlling unit 5A operated by the CPU 101 of MFP 5.

In FIG. 3, the controlling unit 5A is grossly divided into a program-controlling unit 20 and a processing unit 40.

The program-controlling unit 20 consists of an application (hereinafter, referred to simply as "APP")-acquiring unit 21, an installed application-recognizing unit 22, an existing application-controlling unit 26, and an APP-transferring unit 32.

The APP-acquiring unit 21 acquires an application program to be installed by the user from an external device supplying the APP (e.g., terminal device 1).

The installed application-recognizing unit 22 has a functional type-recognizing unit 23, a function/API-recognizing unit 24, and a needed resource-recognizing unit 25.

The functional type-recognizing unit 23 recognizes the functional type of the installed application.

The function/API-recognizing unit 24 recognizes the function and the API (Application Programming Interface) to be used by the installed application.

The needed resource-recognizing unit 25 recognizes the resource (the first resource) needed for operation of the installed application. The resource is, for example, primary memory capacity, secondary memory capacity, or the processing capacity of CPU 101. The primary memory capacity is a memory capacity used for operation of the installed application, and is a memory capacity desirable for the RAM 103 shown in FIG. 2 in the present embodiment. The secondary memory capacity is a memory capacity needed for installation of the application, and is a memory capacity desirable for the hard disk 104 shown in FIG. 2 in the present embodiment.

In the present embodiment, recognition of the functional type in the functional type-recognizing unit 23, recognition of the function and API in the function/API-recognizing unit 24, and detection of the first resource in the needed resource-recognizing unit 25 are performed by reading the following information added to the installed application:
(I) Application type: image conversion
(II) Resource: primary memory capacity: 512 KByte
    secondary memory capacity: 128 KByte
    CPU: 6 MIPS
(III) Function used (API): raw data-transferring API
    secondary data-storing API The existing application-controlling unit 26 has a functional type-recognizing unit 27, a function/API-recognizing unit 28, a needed resource-recognizing unit 29, an application exchange-controlling unit 30, and an API-controlling unit 31. The functional type-recognizing unit 27 recognizes the types of the functions available on the MFP.

The function/API-recognizing unit 28 recognizes the functions available on the MFP and the API's responsible for the functions available on the MFP. The needed resource-recognizing unit 29 recognizes the resources consumed by the functions available on the MFP.

The application exchange-controlling unit 30 controls installation of an application when it is newly installed. It recognizes, for example, the current resource (second resource) available for a newly installed application, in other words an open resource, and compares the first resource with the second resource, and, when it is not possible to secure the first resource without eliminating and/or terminating the pre-installed functions after comparison, performs processing for elimination and/or termination of the function and installs a new application.

The API-controlling unit 31 above enables the functions above, by controlling the API responsible for operation of the instructed function in the terminal device. The APP-transferring unit 32 sends the data on the function decided to be eliminated by the application exchange-controlling unit 30 to an external device (e.g., terminal device 2).

In the present embodiment, recognition of the function in the functional type-recognizing unit 27, recognition of the function and API in the function/API-recognizing unit 28, and detection of the resource in the needed resource-recognizing unit 29 are performed, based on the information which MFP has about each functions, about the used resource, functional type, and the API responsible for each function. Examples of the information include the followings:
(I) Function name: PDF-generating function
(II) Used resource: CPU: 10 MIPS
    primary memory: 1,024 MByte
    secondary memory: 256 KByte
(III) Available API: PDF-converting API
(IV) Functional type: image conversion The size of the second resource is determined by the application exchange-controlling unit 30, from the total of the resources for respective functions and the entire resources.

The processing unit 40, which executes various processings in MFP 5, has a memory-controlling unit 41 controlling RAM 103, a nonvolatile memory-controlling unit 42 controlling ROM 102, a touch panel-controlling unit 43 controlling a touch panel-displaying unit (not shown in the Figure), a scanner-controlling unit 44 controlling the image-reading unit 106, an outside communication unit 45 controlling the network interface 108 and communicating with external devices, an image-controlling unit 46 performing image processing and others, an engine-controlling unit 48 controlling printing unit 107, and a job-controlling unit 49 controlling jobs.

In the MFP 5 having such a controlling unit 5A, when an application to be installed is supplied from an external device (e.g., terminal device 1), the application is obtained in the APP-acquiring unit 21. In the installed application-recognizing unit 22, based on the information attached to the obtained application, the functional type of the application is determined in the functional type-recognizing unit 23; the function (API) to be used by the application is determined in the function/API-recognizing unit; and the first resource needed for storing and operating the application is determined in the resource-recognizing unit 25.

On the other hand, the functional type of existing functions and the API responsible for the function are determined and the second resource, a currently available open resource, is determined in the existing application-controlling unit 26. If the second resource is greater in capacity than the first resource, when the first resource needed for operation of the installed application and the second resource usable in MFP 5 is compared, the second resource is regarded to be ready to accept the application, and the application is installed as it is.

When the second resource is smaller than the first resource, part of the functions of MFP 5 are eliminated. Then, the data on the functions eliminated may be sent to external devices such as terminal devices 1 to 3. When an existing application is in operation, consuming the memory capacity of the second resource and thus, the second resource is smaller than the first resource, operation of the existing application is terminated.

By this processing, when an application is installed, even when there is some restriction on the resources such as primary memory capacity, secondary memory capacity, and the processing capacity of CPU, it is possible to install the application and allow it to operate suitably, without installing an additional application compatible therewith or terminating the unused function manually.

The criteria for the function to be eliminated or terminated are as follows:
(I) The function corresponding to the API which the installed application uses is not eliminated or terminated. In the example above, it corresponds to the raw data-transmitting API and the secondary memory-storing API.

(II) Functions similar to the function of the installed application are eliminated or terminated preferentially. In this example, the type of the installed application is "image conversion", and thus, the image-converting function, which is similar thereto, is eliminated preferentially.

Hereinafter, the processing to install a new application in MFP 5 will be described with reference to the flowchart of FIG. 4. The processing is performed by operation of the CPU 101 in controlling unit 5A in accordance with the program stored in ROM 102.

Figure 4:
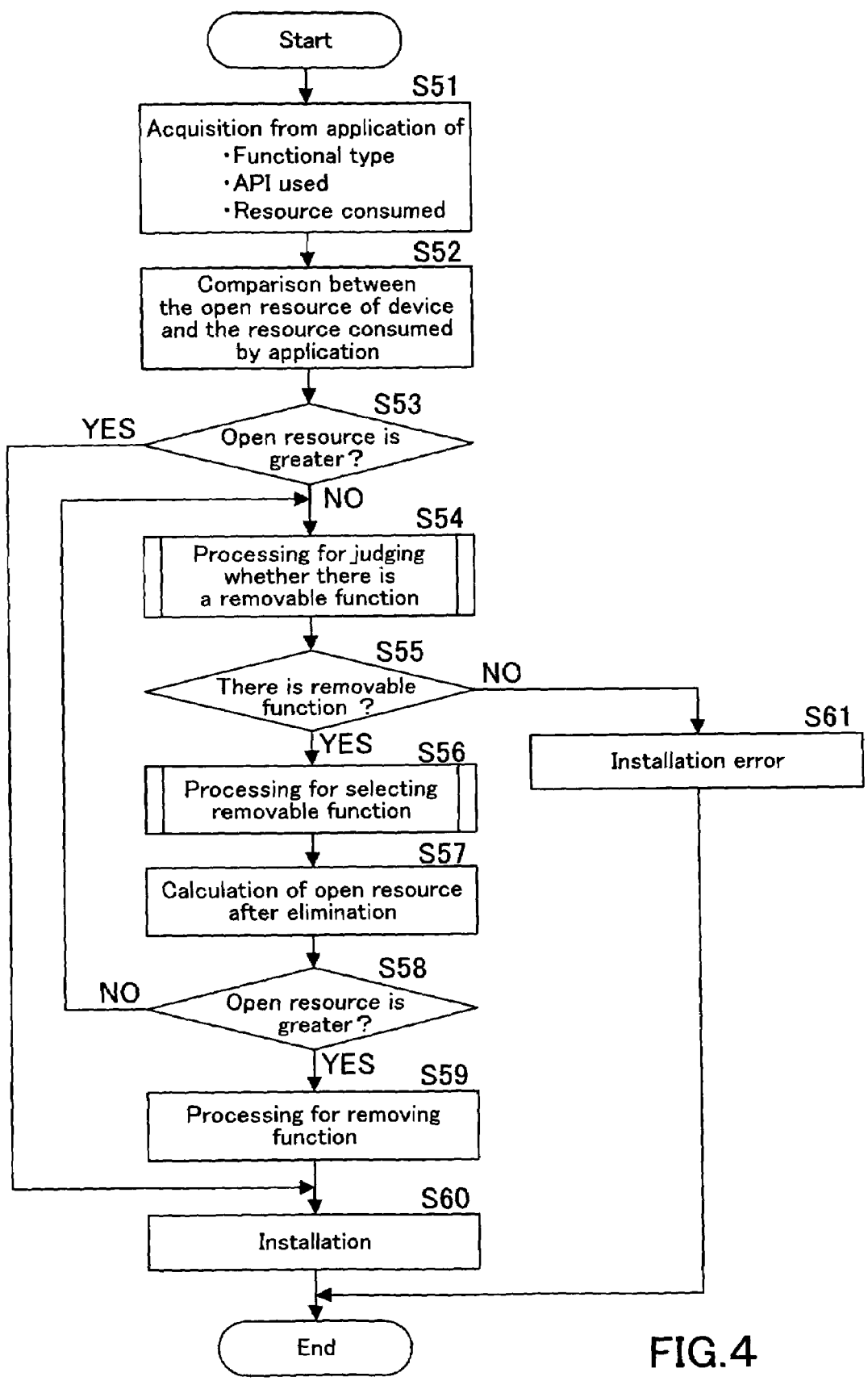
FIG. 4 is a flowchart showing the processing for installing an application in MFP.

In step S51 in FIG. 4, data on the functional type, the API used, and the resource used by application (first resource needed for storage and operation of application) are acquired from the installed application, and the open resource (second resource usable for storage and operation of installed application) and the used resource in MFP 5 are compared in step S52.

In step S53, it is judged whether the open resource in MFP 5 is greater than the resource used by application. If the open resource in MFP 5 is greater than the resource used by application (YES in step S53), the application is installed in step S60, and the processing terminates. If the open resource in MFP 5 is not greater than the resource used by the application (NO in step S53), the processing advances to step S54.

In step S54, the processing for judging whether there is a function in MFP 5 that can be eliminated is performed. Then in step S55, it is judged whether there is a removable function; and if there is a removable function (YES in step S55), the processing advances to step S56; and if there is no removable function (NO in step S55), the processing of an installation error is performed in step S61; and the processing terminates.

A removable function is selected in step S56; the open resource after elimination is calculated in step S57; and the processing advances to step S58. It is judged whether the open resource after elimination of the function is greater than the resource used by application in step S58; if the open resource is greater than the resource used by application (YES in step S58), the function is eliminated in step S59, securing the open resource; and the application is installed in step S60. If the open resource is not greater than the resource used by application (NO in step S58), it is judged once again whether there is a removable function, back in step S54.

Then, the subroutine of the processing for judging whether there is a removable function (step S54) in FIG. 4 will be described, with reference to the flowchart in FIG. 5.

Figure 5:
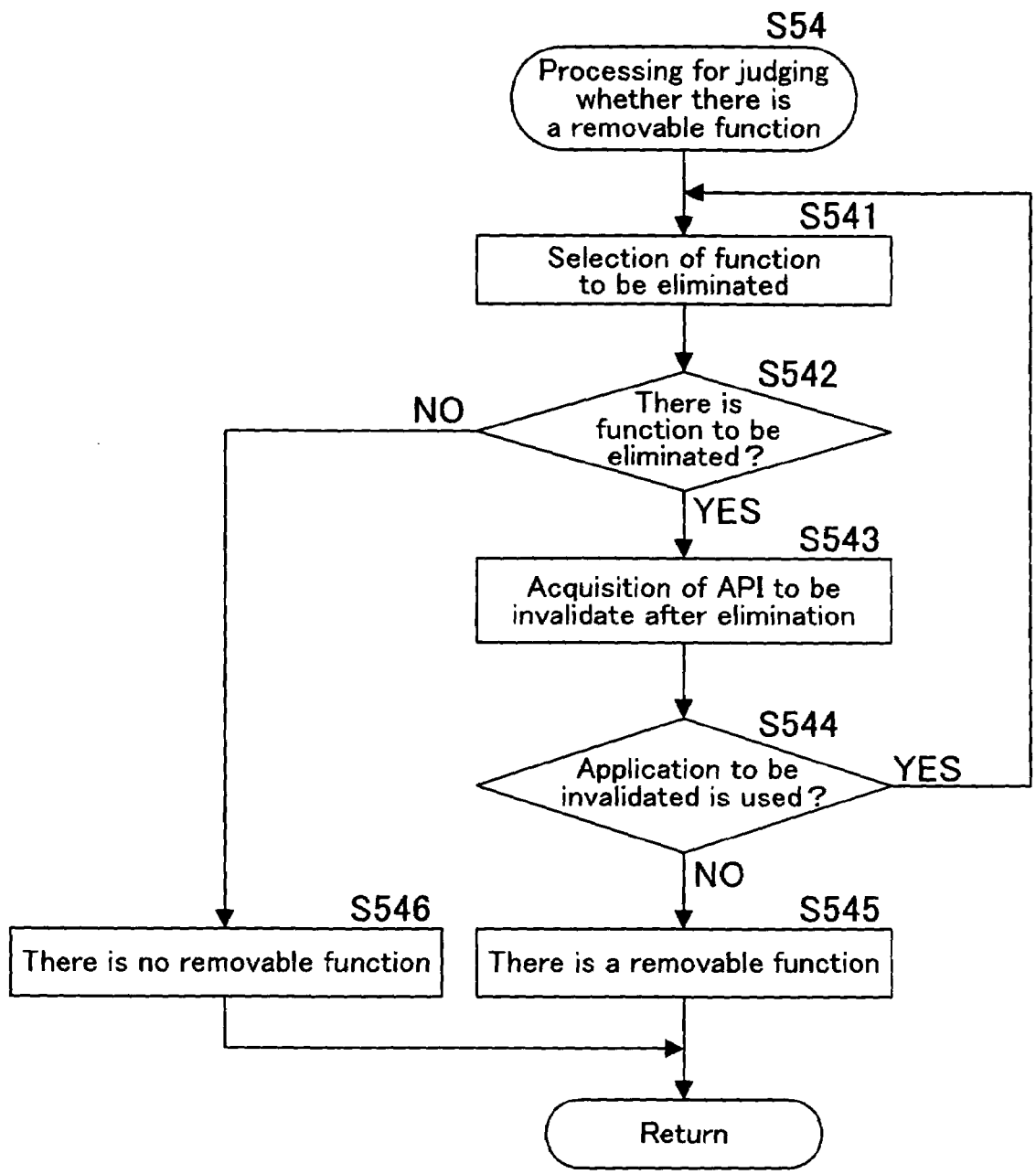
FIG. 5 is a flowchart showing the subroutine of the processing for judging a removable function in the flowchart of FIG. 4.

In FIG. 5, the function to be eliminated is selected in step S541; it is judged whether there is a function to be eliminated in step S542; if there is a function to be eliminated (YES in step S542), the API that becomes ineffective after elimination is obtained in step S543; and processing advances to step S544. If there is no function to be eliminated (NO in step S542), it is set that there is no removable function in step S546; and the processing goes back to the main routine.

It is judged whether the application to be installed uses the API to be invalidated in step S544; if the application to be installed uses the API to be invalidated (YES in step S544), the function cannot be removed; and the processing goes back to step S541 and the function to be eliminated is selected once again. If the application to be installed does not use the API to be invalidated (NO in step S544), the function may be eliminated, and thus, it is set that there is a removable function in step S545 and the processing goes back to the main routine.

Hereinafter, the subroutine of the processing for selecting a removable function (step S56) in FIG. 4 will be described with reference to the flowchart shown in FIG. 6.

Figure 6:
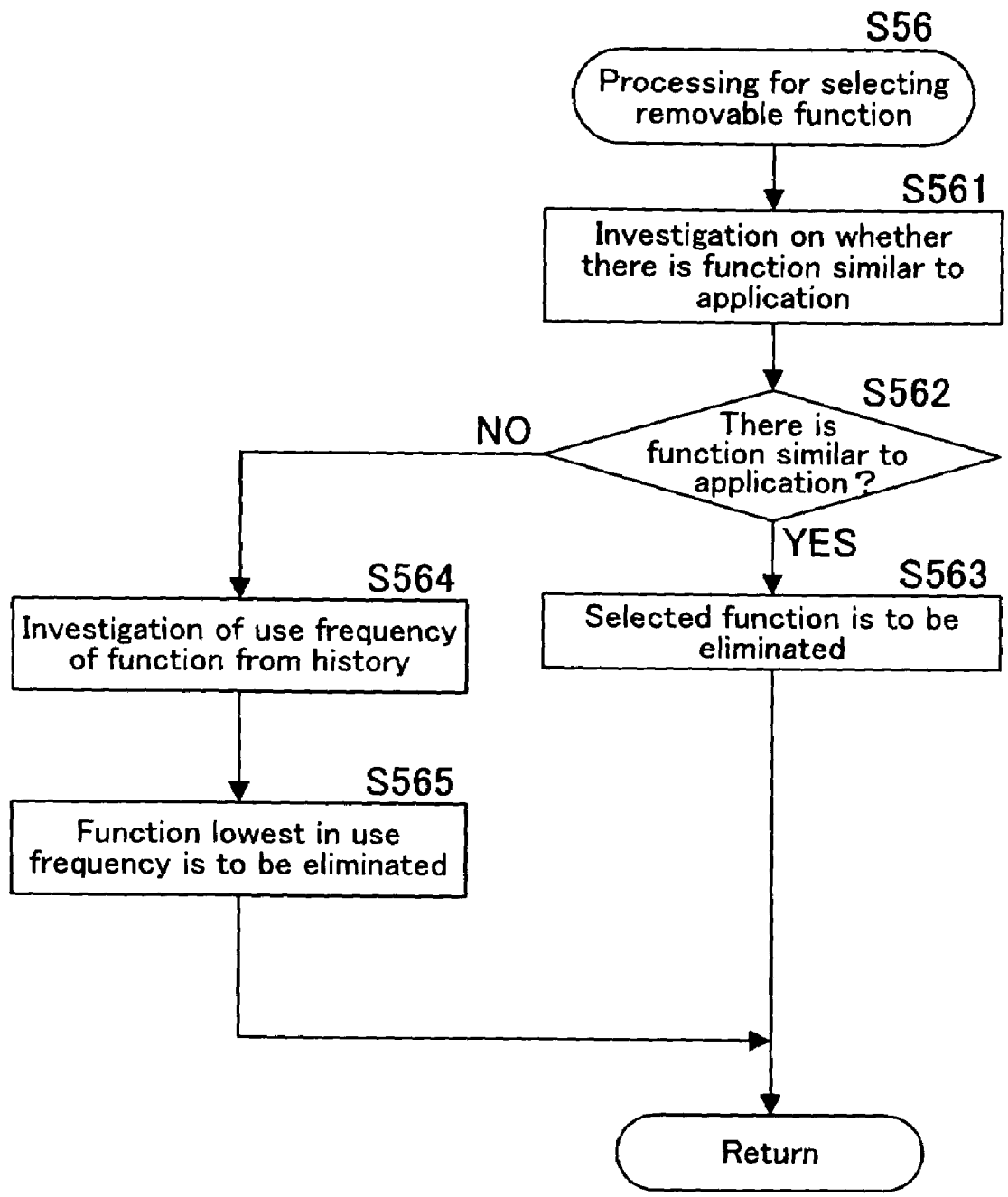
FIG. 6 is a flowchart showing the subroutine of the processing for selecting a removable function in the flowchart of FIG. 4.

In FIG. 6, it is investigated whether there is a function similar to the application to be installed among the functions to be eliminated in step S561; and then, it is judged whether there is a function similar to the application in step S562. If there is a function similar to the application (YES in step S562), it is set that the selected function is to be removed in step S563; and the processing goes back to the main routine.

Because a function similar to the installed application is eliminated in this way, it is possible to prevent the inconvenience caused by elimination of a different and also to eliminate the duplicated functions to the minimal degree, making a device higher in efficiency of use.

If there is no function similar to the application (NO in step S562), the use frequency of the functions is determined from the use history in step S564; it is set that the function lowest in use frequency is to be eliminated in step S565; and the processing goes back to the main routine.

Hereinafter, another process of installing an application in MFP 5 will be described with reference to the flowchart shown in FIG. 7. The processing is also performed, similarly to the processing in FIG. 4, by operation of the CPU 101 in controlling unit 5A according to the program stored in ROM 102.

Figure 7:
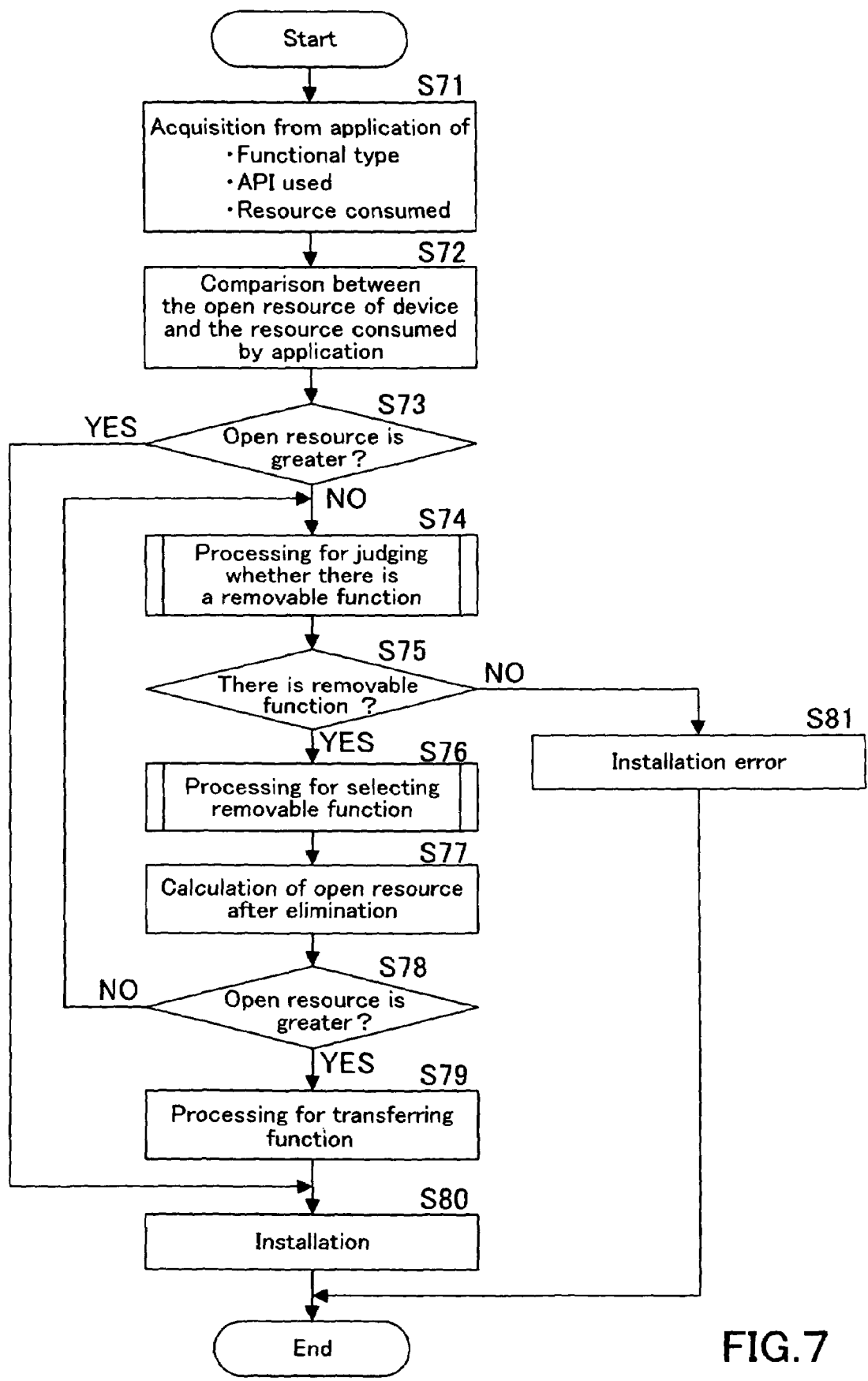
FIG. 7 is a flowchart showing another processing of installing an application.

The processing shown in FIG. 7 is processing to transmit the data on a function to be removed to other external devices such as MFP's 6 to 8 when a needed open resource is secured by removing the function of MFP 4, and steps S71 to S78 and steps S80 and S81 are the same as steps S51 to 58 in FIG. 4.

In FIG. 7, the functional type, the API used, and the resource used by application (first resource) are obtained from the installed application in step S71, and the open resource in MFP 5 (second resource) and the used resource are compared in step S72.

In step S73, it is judged whether the open resource in MFP 5 is greater than the resource used by application. If the open resource in MFP 5 is greater than the resource used by the application (YES in step S73), the application is installed as it is in step S80, and the processing terminates. If the open resource in MFP 5 is not greater than the resource used by the application (NO in step S73), the processing advances to step S74.

In step S74, the processing for judging whether there is a removable function in MFP 5 is performed. Then in step S75, it is judged whether there is a removable function; if there is a removable function (YES in step S75), the processing advances to step S76; if there is no removable function (NO in step S75), the processing of an installation error is performed in step S81, and the processing terminates.

A removable function is selected in step S76; the open resource after its removal is calculated in step S77; and the processing advances to step S78.

It is judged whether the open resource obtained by removal of the function is greater than the resource used by application in step S78; if the open resource is greater than the resource used by the application (YES in step S78), the function is transferred in step S79; and the processing advances to step S80 and terminates. If the open resource is not greater tan the resource used by the application (NO in step S78), the processing goes back to step S74 and repeats the processing for judging whether there is a removable function.

The subroutine of the processing for judging whether there is a removable function (step S74) is the same as that in FIG. 5, and the subroutine of the processing for selecting the function to be removed (step S76) is the same as that shown in FIG. 6. Then, the subroutine of the processing for transferring function (step S79) shown in FIG. 7 will be described with reference to the flowchart shown in FIG. 8.

Figure 8:
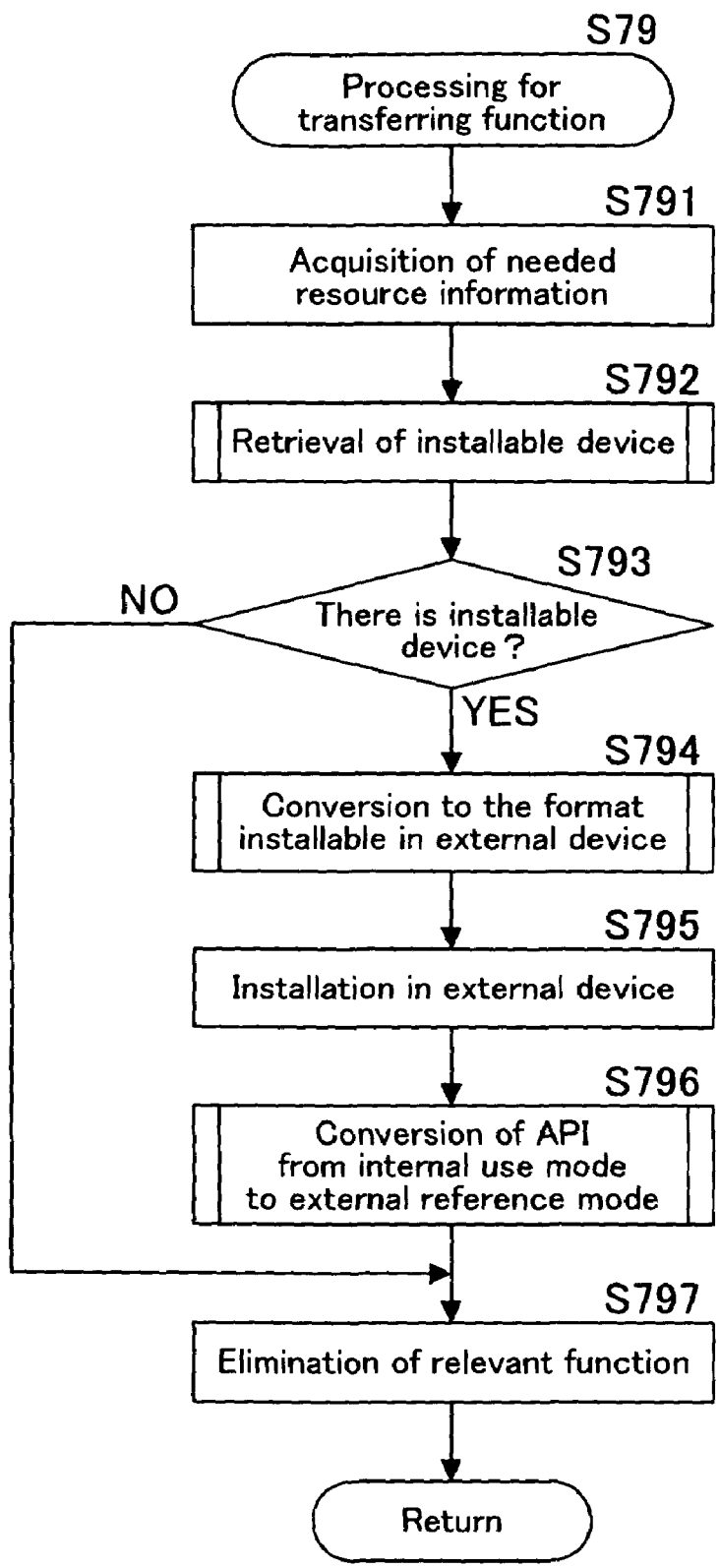
FIG. 8 is a flowchart showing the subroutine of the processing for transferring function in the flowchart shown in FIG. 7.

In FIG. 8, needed information is obtained from an external device in step S791, and an installable external device is selected in step S792, and the processing advances to step S793.

It is judged whether there is an installable external device in step S793; if there is no installable external device (NO in step S793), the function to be removed is removed without transfer thereof to an external device in step S797, and the processing goes back to the main routine. If there is an installable external device (YES in step S793), the processing advances to step S794.

The application of the function to be removed is converted into data installable in the external device in step S794, and the converted data is transferred to and installed in the external device in step S795. The data on the function to be removed is thus transferred into an external device, and the function can be used any time after retrieval or be transferred back to the image processing apparatus if required.

Then in step S796, the API responsible for the function is changed from internal use mode to external reference mode; the same function is removed in step S797; and the processing goes back to the main routine.

Hereinafter, the subroutine of the processing for retrieving an installable external device (step S792) in FIG. 8 will be described with reference to the flowchart shown in FIG. 9.

Figure 9:
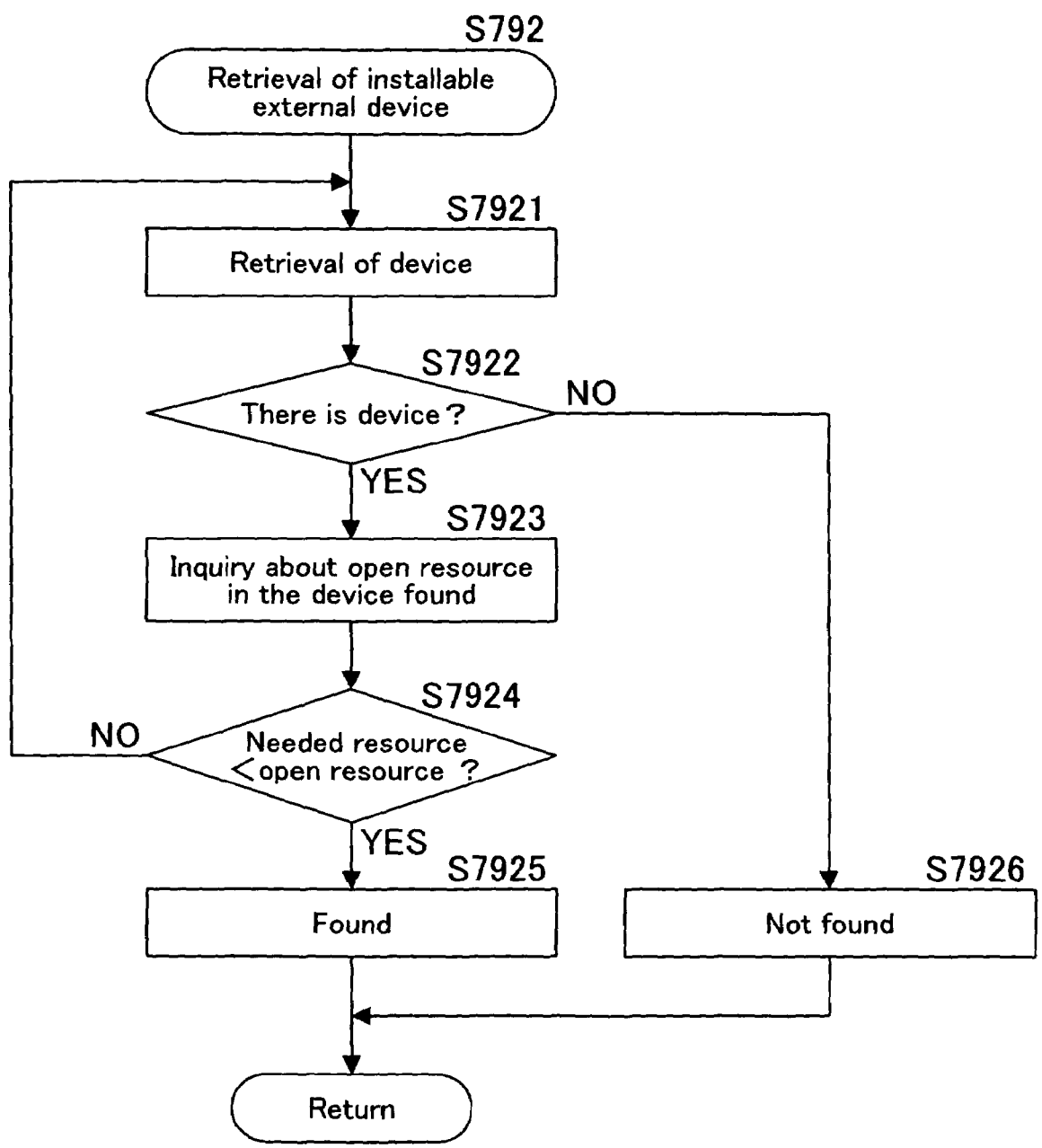
FIG. 9 is a flowchart showing the subroutine of the processing for retrieving an installable external device in the flowchart shown in FIG. 7.

In FIG. 9, an installable external device is retrieved in step S7921; it is judged whether there is an installable external device in step S7922; if there is an installable external device (YES in step S7922); the processing advances to step S7923. If there is no installable external device (NO in step S7922), it is set that there is no installable external device in step S7926, and the processing goes back to the main routine.

The open resource in the external device found is inquired in step S7923; it is judged whether the open resource in the external device 2 is greater than the resource needed for installing and executing the application of the function to be removed in step S7924; if the open resource is greater than the needed resource (YES in step S7924), it is judged that it is installable; it is set that there is an installable external device 2 found in step S7925; and the processing goes back to the main routine.

Hereinafter, the subroutine of the processing for converting data into a format installable in an external device (step S794) in FIG. 7 will be described with reference to the flowchart shown in FIG. 10.

Figure 10:
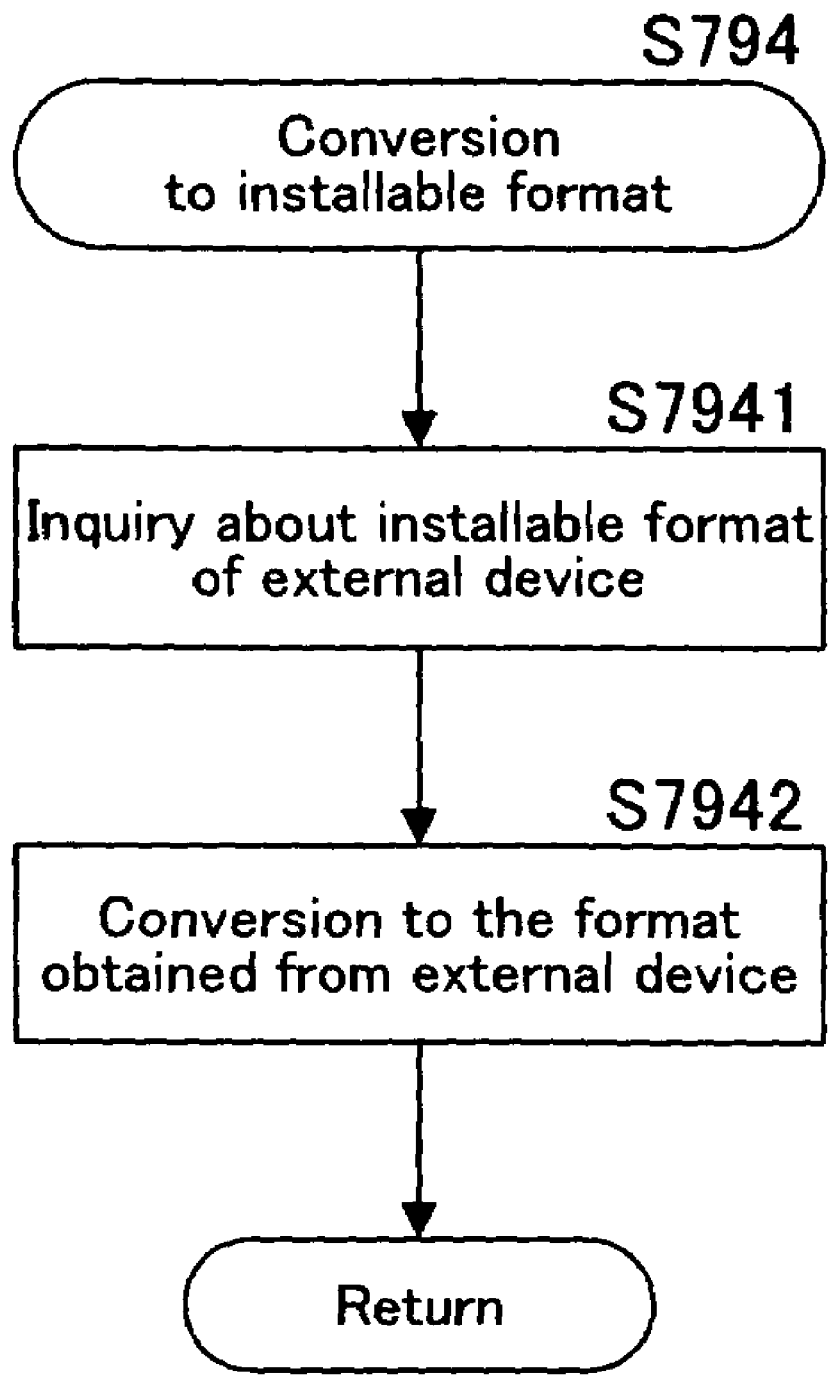
FIG. 10 is a flowchart showing the subroutine of the processing for converting data into the data format installable into an external device in the flowchart shown in FIG. 7.
Figure 1:
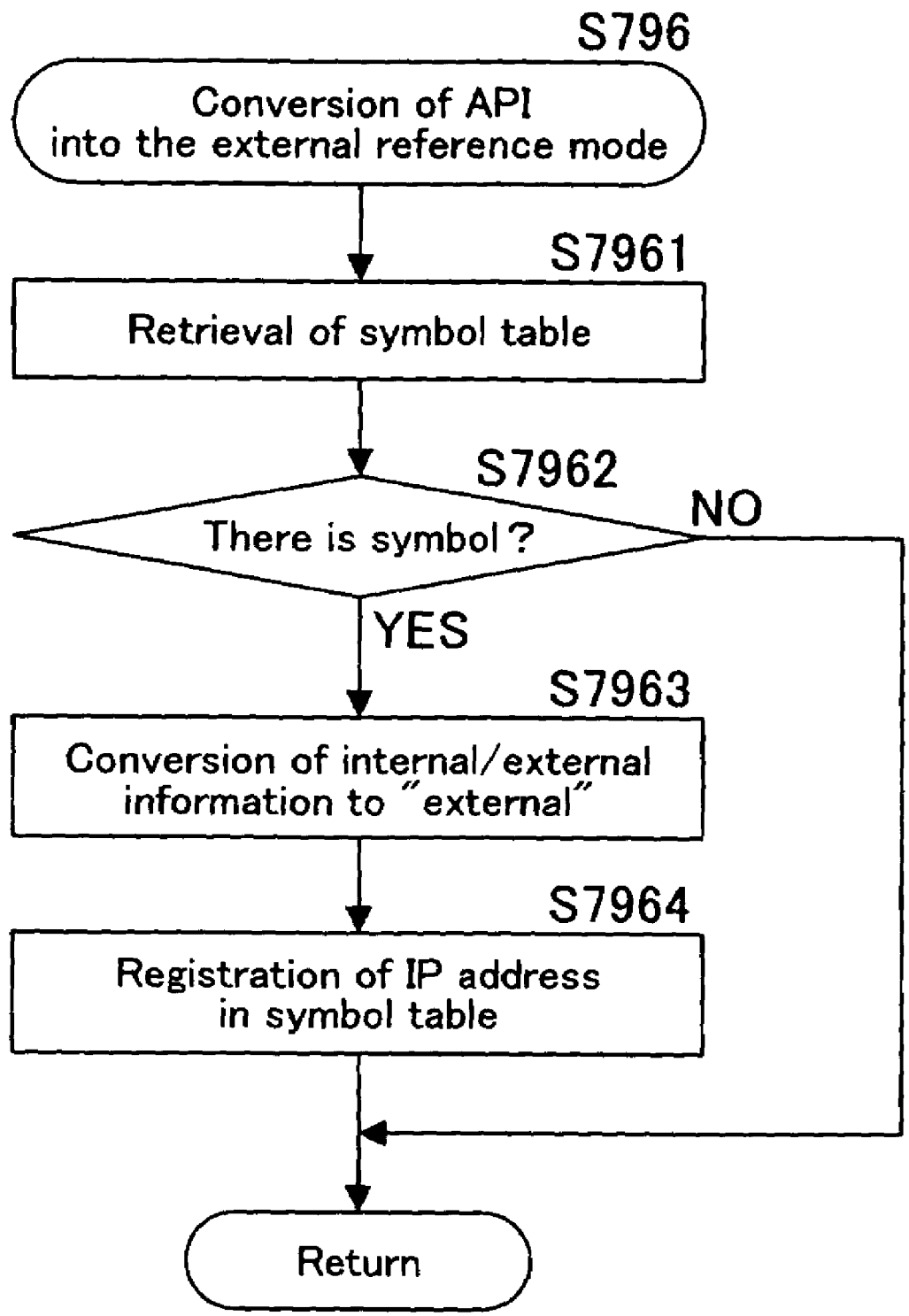

In FIG. 10, the data format installable in the external device is inquired in step S7941; the application of the function to be removed is converted into the data format obtained from the external device in step S7942; and the processing goes back to the main routine. The information of installable data format is stored in ROM 102; the application of the function to be removed is converted into the data format identical with the data format retrieved from the external device stored in ROM 102.

The installable data formats include executive formats (.EXE/.DLL), object formats (.OBJ/.O), library (.LIB), Java application, Java applet, Java Servlet, and the like. Hereinafter, the subroutine of the processing for changing the API from the internal use mode to external reference mode (step S796) in FIG. 8 will be described with reference to the flowchart in FIG. 11.

In FIG. 11, a symbol table is retrieved in step S7961. The symbol table is stored in RAM 103. FIG. 12 shows the contents in the symbol table. The symbol table contains the symbol name of API, information about use mode, internal or external (simply inside/outside in FIG. 11), and the address when in the internal use mode or the IP address of the external device in the external reference mode.

Then, it is judged whether there is a corresponding API symbol name in step S7962. If there is a symbol name (YES in step S7962), the processing advances to step S7963; while if there is no symbol name (NO in step S7962), the processing goes back to the main routine.

The information about the internal use mode or external reference mode is converted into the "external reference mode" in step S7963; the IP address of the external device in transfer destination is registered in the symbol table in step S7964; and the processing goes back to the main routine.

FIG. 13 shows a symbol table after conversion. In the table, as apparent from comparison with the symbol table shown in FIG. 12 before change, the API having a symbol name of "pdfConvert" is converted into the external reference mode.

Hereinafter, another processing for installing an application in MFP 5 will be described with reference to the flowchart shown in FIG. 14. The API used by the installed application is recognized and the function performed by the API unused by the installed application is eliminated in the processing shown in FIG. 4, while the function used by the installed application is recognized and the function unused by the installed application is eliminated in the processing in FIG. 14. The processing in FIG. 14 is also performed by operation of the CPU 101 in controlling unit 5A according to the program stored in ROM 102, in a similar manner to the processing in FIG. 4.

Figure 14:
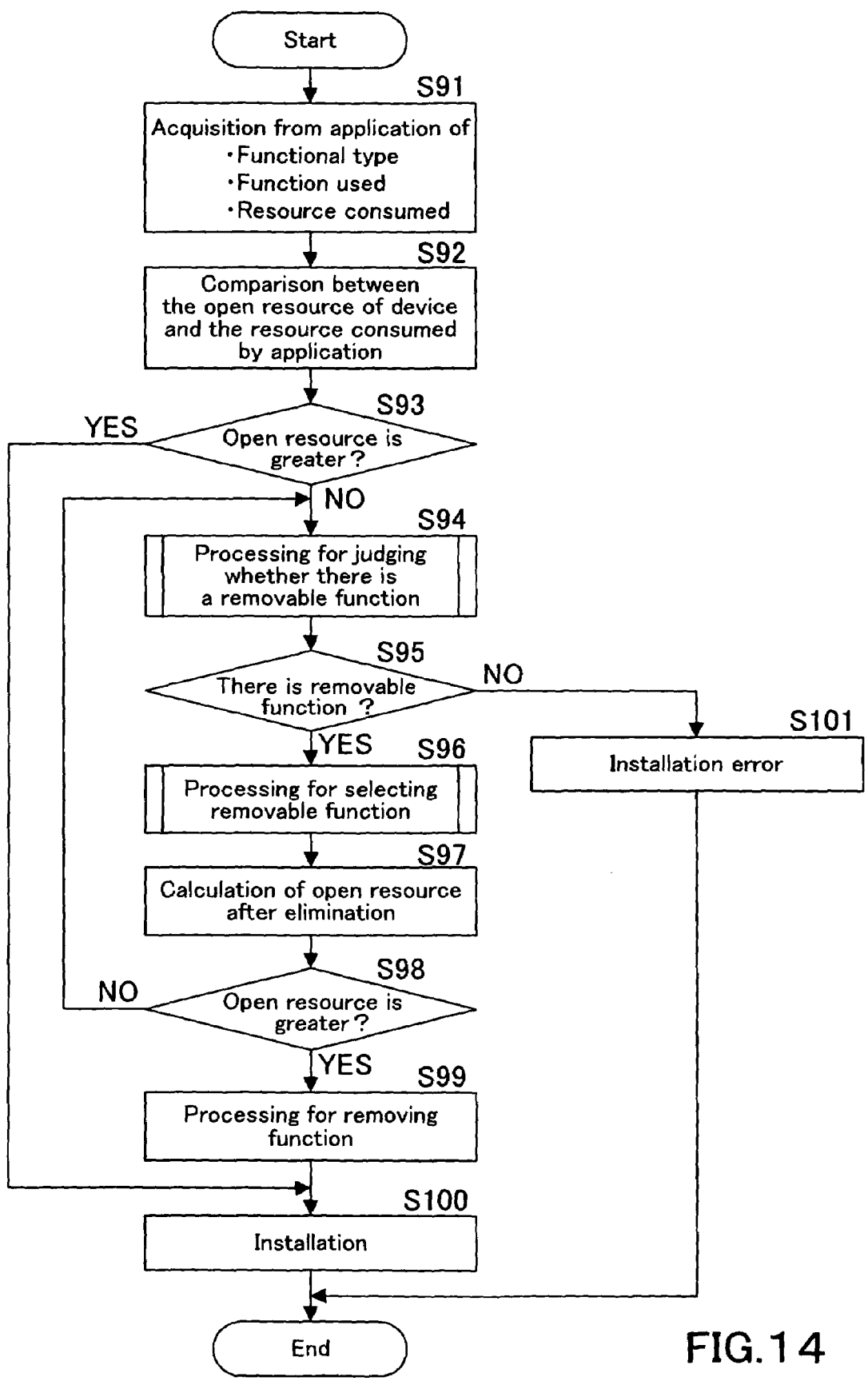
FIG. 14 is a flowchart showing another processing when an application is installed in MFP.

In FIG. 14, the functional type, function used, and resource used by application (first resource needed for storage and operation of application) are obtained from the installed application in step S91; the open resource in MFP 5 (second resource usable for storage and operation of installed application) and the resource used are compared in step S92.

In step S93, it is judged whether the open resource in MFP 5 is greater than the resource used by application. If the open resource in MFP 5 is greater than the resource used by application (YES in step S93), the application is installed as it is in step S100, and the processing terminates. If the open resource in MFP 5 is not greater than the resource used by application (NO in step S93), the processing advances to step S94. In step S94, the processing for judging whether the MFP 5 has a removable function is performed. Then, it is judged whether there is a removable function in step S95; if there is a removable function (YES in step S95), the processing advances to step S96; if there is no removable function (NO in step S95), processing of an installation error is performed in step S101, and the processing terminates.

A removable function is selected in step S96; the open resource available after elimination is calculated in step S97; and the processing advances to step S98.

It is judged whether the open resource available by elimination of the function is greater than the resource used by application in step S98; if the open resource is greater than the resource used by application (YES in step S98), the function is eliminated, securing the open resource in step S99; and the processing advances to step S100, and the application is installed. If the open resource is not greater than the resource used by application (NO in step S98), the processing goes back to step S94 and the processing for judging whether there is a removable function is repeated.

Hereinafter, the subroutine of the processing for judging whether there is a removable function (step S94) in FIG. 14 will be described with reference to the flowchart in FIG. 15.

Figure 15:
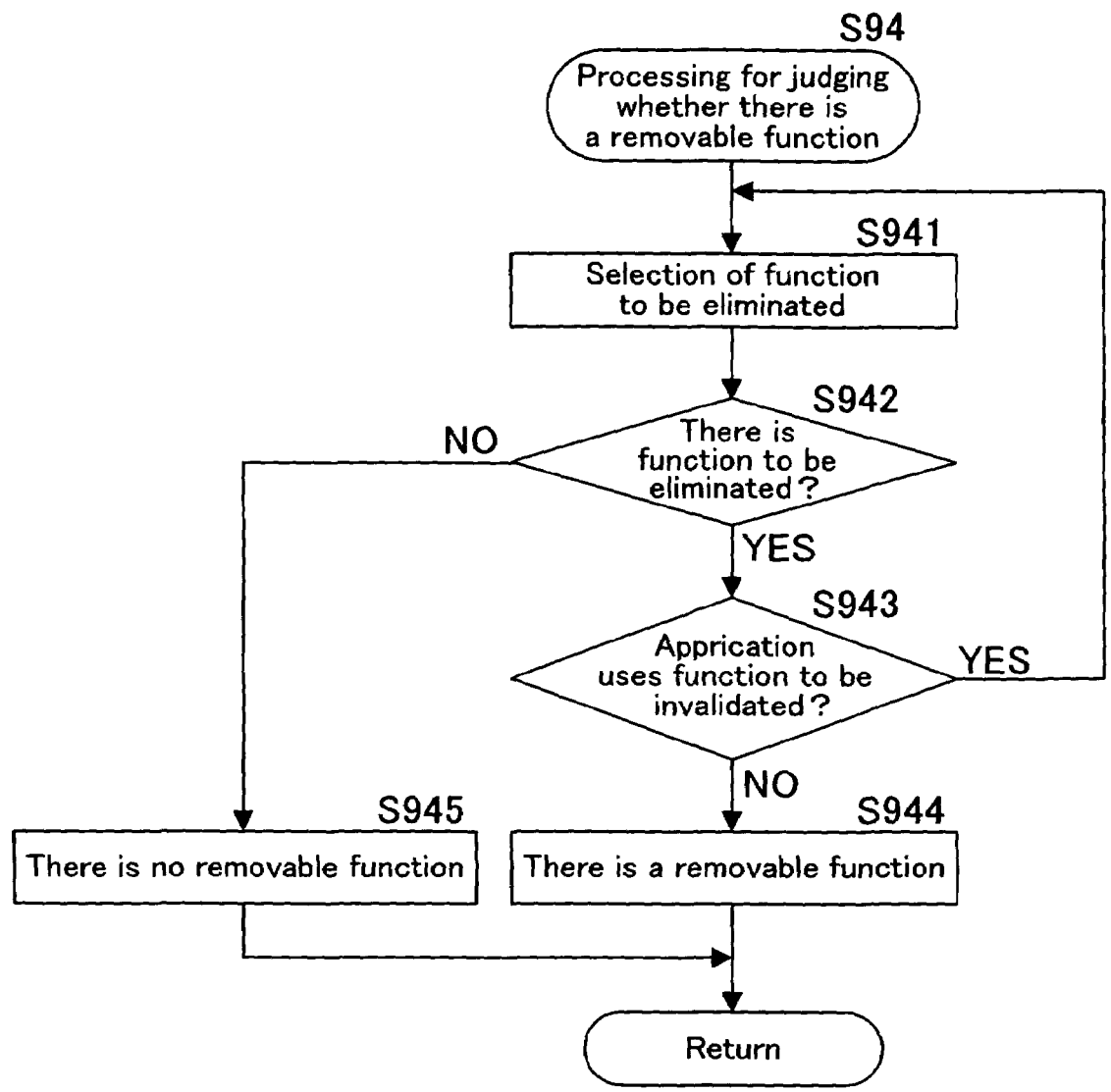
FIG. 15 is a flowchart showing the subroutine of the processing for judging a removable function in the flowchart of FIG. 14.

In FIG. 15, a function to be eliminated is selected in step S941; it is judged whether there is a function to be eliminated in step S942; and if there is a function to be eliminated (YES in step S942), the processing advances to step S943. If there is no function to be eliminated (NO in step S942), it is set that there is no removable function in step S545, and the processing goes back to the main routine.

It is judged whether the application to be installed will use the function to be inactivated in step S943; if the application to be installed uses the function to be inactivated (YES in step S943), the processing goes back to step S941, because it is not possible to eliminate the function; and the processing for selecting the function to be eliminated is repeated. If the application to be installed does not use the function to be inactivated (NO in step S943), it is set that there is a removable function in step S944, because there is no problem in eliminating the function; and the processing goes back to the main routine.

The processing for selecting a removable function (step S96) shown in FIG. 14 is the same as the processing for selecting a removable function (FIG. 4 の step S56) shown in FIG. 6, and the description thereof is omitted.

Similarly to the processing shown in FIG. 7, in the embodiments shown in FIGS. 14 and 15, the data on the function to be removed may be transferred to the other external devices such as MFP's 6 to 8 when the function in MFP 4 is eliminated for providing a needed open resource.

Hereinafter, yet another processing for installing an application in MFP 5 will be described with reference to the flowchart shown FIG. 16. In the present embodiment, in addition to the processing shown in FIG. 4, an open resource for installation of an application is secured by terminating the function unused by the installed application.

Figure 16:
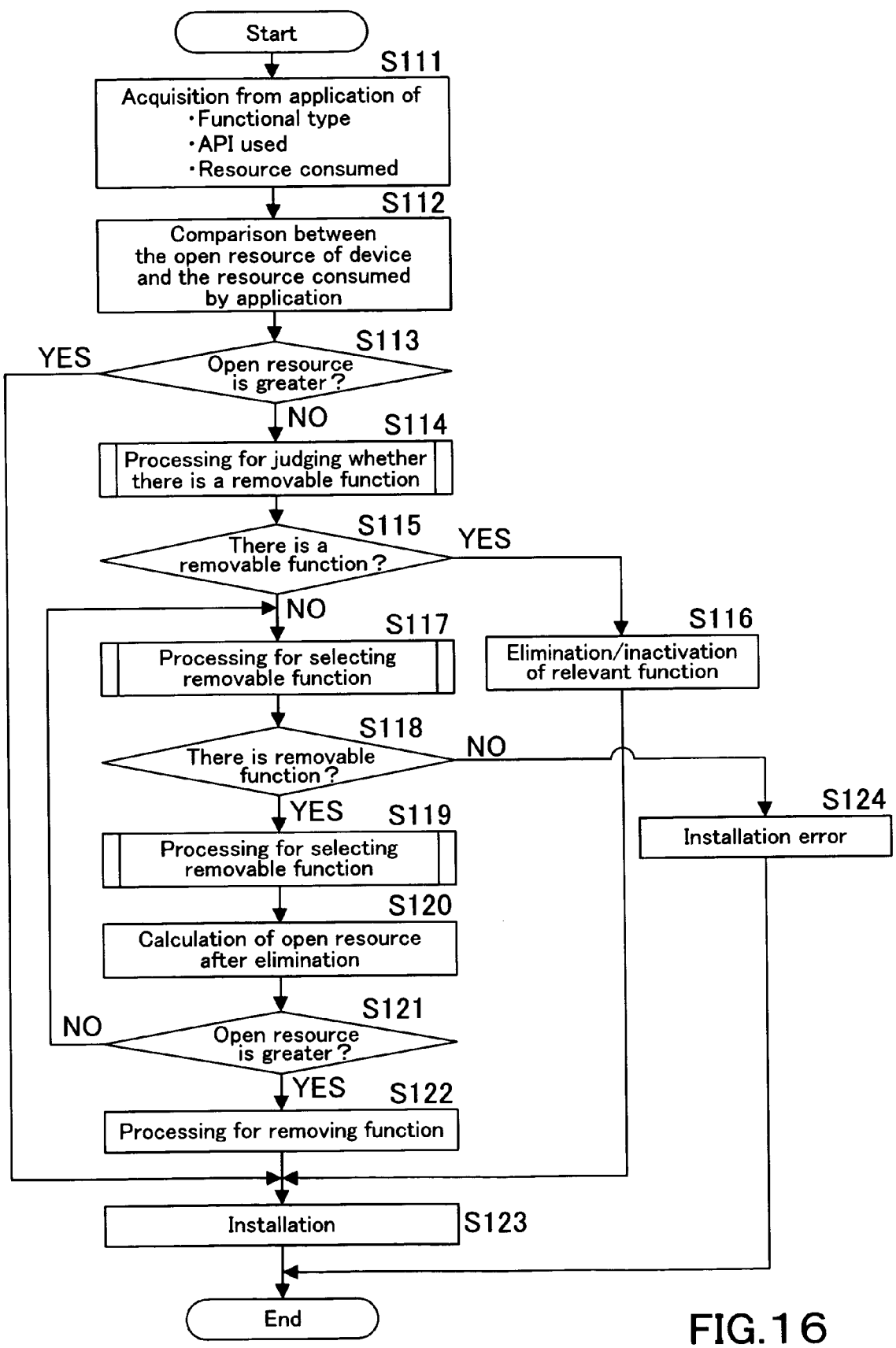
FIG. 16 is a flowchart showing another processing when an application is installed in MFP.

The processing shown in FIG. 16 is also performed by operation of the CPU 101 in controlling unit 5A according to the program stored in ROM 102, similarly to the processing in FIG. 4.

In FIG. 16, the functional type, API used, and the resource used by application (first resource needed for storage and operation of application) are obtained from the installed application in step S111. A function used may be obtained, instead of the API used, as shown in FIG. 14.

Then in step S112, the open resource in MFP 5 (second resource usable for storage and operation of installed application) and the resource used are compared. In step S113, it is judged whether the open resource in MFP 5 is greater than the resource used by application. If the open resource in MFP 5 is greater than the resource used by application (YES in step S113), the application is installed as it is in step S123, and the processing terminates. If the open resource in MFP 5 is not greater than the resource used by application (NO in step S113), the processing advances to step S114.

In step S114, the processing for judging whether there is a function that may be inactivated in MFP 5 is performed. Then, it is judged whether there is an inactivatable function in step S115; if there is an inactivatable function (YES in step S115), the processing advances to step S116; and if there is no inactivatable function (NO in step S115), the processing advances to step S117.

An open resource is secured by eliminating and inactivating the same function in step S116, and the processing advances to step S123 and the application is installed.

On the other hand in step S117, the processing for judging whether there is a removable function in MFP 5 is performed. It is then judged whether there is a removable function in step S118; if there is a removable function (YES in step S118), the processing advances to step S119; if there is no removable function (NO in step S118), processing of an installation error is performed in step S124, and the processing terminates.

A removable function is selected in step S119; the open resource available after elimination is calculated in step S120; and the processing advances to step S121.

It is judged whether the open resource available after elimination is greater than the resource used by application in step S121; if the open resource is greater than the resource used by application (YES in step S121), the function is eliminated, securing the open resource in step S122; and the processing advances to step S123, and the application is installed. If the open resource is not greater tan the resource used by application (NO in step S121), the processing goes back to step S117 and the processing for judging whether there is a removable function is repeated.

Hereinafter, the subroutine for the processing for judging whether there is a inactivatable function (step S114) shown in FIG. 16 will be described with reference to the flowchart shown in FIG. 17.

Figure 17:
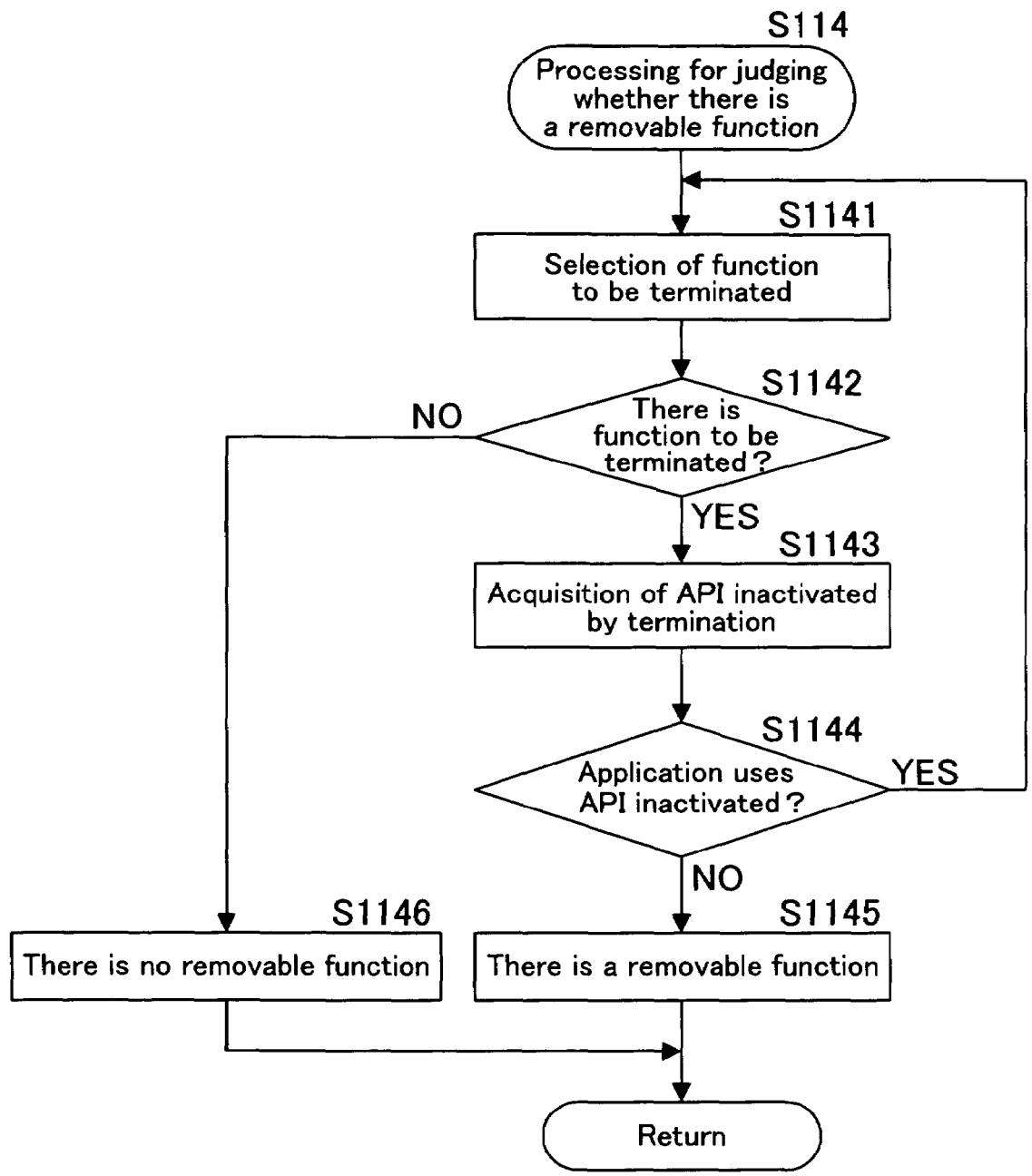
FIG. 17 is a flowchart showing the subroutine of the processing for judging an inactivatable function in the flowchart of FIG. 16.

In FIG. 17, the function to be terminated is selected in step S1141; it is judged whether there is a function to be terminated in step S1142; if there is a function to be terminated (YES in step S1142), the API to be invalidated by termination is obtained in step S1143; and the processing advances to step S1144. If there is no function to be terminated (NO in step S1142), it is set that there is no function to be terminated in step S1146, and the processing goes back to the main routine.

It is judged whether the API to be invalidated is used by the application to be installed in step S1144; if the API to be invalidated is used by the application to be installed (YES in step S1144), the processing goes back to step S1141, because the function cannot be terminated; and the processing for selecting the function to be terminated is repeated. If the application to be installed does not use the API to be invalidated (NO in step S1144), it is set that there is a function to be terminated in step S1145, because there is no problem in terminating the function; and the processing goes back to the main routine.

The processings for judging whether there is a removable function (step S117) and for selecting the removable function (step S119) in FIG. 14 are the same respectively as those shown in FIGS. 5 and 6, and the description thereof is omitted.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An image processing apparatus, comprising:
   a first function-judging unit of judging functions used by a newly installed application,
   a second function-judging unit of judging functions available in the image processing apparatus, and
   a control unit of terminating and/or eliminating one or more of the functions in the image processing apparatus unused by the newly installed application, based on the results obtained in the first function-judging unit and the second function-judging unit when the application is installed.

2. An image processing apparatus, comprising
   an API-judging unit of judging an API used by a newly installed application,
   a function-judging unit of judging functions available in the image processing apparatus, and
   a control unit of terminating and/or eliminating one or more of the functions in the image processing apparatus played by the API unused by the newly installed application, based on the judgment results obtained in the API-judging unit and the function-judging unit when the new application is to be installed.

3. The image processing apparatus according to claim 1, further comprising
   a first resource-detecting unit of detecting a first resource needed for operation of the application,
   a second resource-detecting unit of detecting a second resource available for operation of the application, and
   a resource-comparing unit of comparing the first resource detected by the first resource-detecting unit with the second resource detected by the second resource detecting unit, wherein
   the-controlling unit allows installation of the application as it is if the second resource is not smaller than the first resource after comparison and terminates and/or eliminates the function if the second resource is smaller than the first resource.

4. The image processing apparatus according to claim 2, further comprising
   a first resource-detecting unit of detecting a first resource needed for operation of the application,
   a second resource-detecting unit of detecting a second resource available for operation of the application, and
   a resource-comparing unit of comparing the first resource detected by the first resource-detecting unit with the second resource detected by the second resource-detecting unit, wherein
   the-controlling unit allows installation of the application as it is if the second resource is not smaller than the first resource after comparison and terminates and/or eliminates the function if the second resource is smaller than the first resource.

5. The image processing apparatus according to claim 3, further comprising
   an application functional type-recognizing unit of identifying the functional type of the application, wherein,
   if the second resource is smaller than the first resource, the-controlling unit terminates and/or eliminates a function similar to the functional type of application identified by the application functional type-recognizing unit that consumes the resource greater than the difference between the first and second resources.

6. The image processing apparatus according to claim 4, further comprising
   an application functional type-recognizing unit of identifying the functional type of the application, wherein,
   if the second resource is smaller than the first resource, the-controlling unit terminates and/or eliminates a function similar to the functional type of application identified in the application functional type-recognizing unit that consumes the resource greater than the difference between the first and second resources.

7. The image processing apparatus according to claim 1, wherein the controlling unit transfers the data on the function to be removed to an external device.

8. The image processing apparatus according to claim 2, wherein the controlling unit transfers the data on the function to be removed to an external device.

9. A method of installing an application in an image processing apparatus, comprising
   a step of judging functions used by a newly installed application,
   a step of judging functions available in the image processing apparatus, and
   a control step of terminating and/or eliminating one or more of the functions in the image processing apparatus unused by the newly installed application, based on the judgment results in the respective judging steps after the new application is to be installed.

10. A method of installing an application in an image processing apparatus, comprising
    a step of judging an API used by a newly installed application,
    a step of judging functions available in the image processing apparatus, and
    a control step of terminating and/or eliminating one or more of the functions in the image processing apparatus of the API unused by the newly installed application, based on the judgment results in the respective judging steps after the new application is to be installed.

11. The method of installing an application in an image processing apparatus according to claim 9, further comprising
    a step of detecting a first resource needed for operation of the application,
    a step of detecting a second resource available for operation of the application, and
    a step of comparing the first resource detected in the first resource-detecting step with the second resource detected in the second resource-detecting step, wherein
    the application is installed as it is in the control step if the second resource is not smaller than the first resource after comparison, and the function is terminated and/or eliminated if the second resource is smaller than the first resource.

12. The method of installing an application in an image processing apparatus according to claim 10, further comprising
- a step of detecting a first resource needed for operation of the application,
- a step of detecting a second resource available for operation of the application, and
- a step of comparing the first resource detected in the first resource-detecting step with the second resource detected in the second resource-detecting step, wherein
- the application is installed as it is in the control step if the second resource is not smaller than the first resource after comparison and the function is terminated and/or eliminated if the second resource is smaller than the first resource.

13. The method of installing an application in an image processing apparatus according to claim 11, further comprising
- a step of identifying the functional type of the application, wherein,
- if the second resource is smaller than the first resource, a function similar to the functional type of the application identified in the identification step that consumes the resource greater than the difference between the first and second resources is terminated and/or eliminated in the control step.

14. The method of installing an application in an image processing apparatus according to claim 12, further comprising
- a step of identifying the functional type of the application, wherein,
- if the second resource is smaller than the first resource, a function similar to the functional type of application identified in the identification step that consumes the resource greater than the difference between the first and second resources is terminated and/or eliminated in the control step.

15. The method of installing an application in an image processing apparatus according to claim 9, wherein the data on the function to be removed is transferred to an external device in the control step.

16. The method of installing an application in an image processing apparatus according to claim 10, wherein the data on the function to be removed is transferred to an external device in the control step.

17. A program stored on a computer readable medium for installing an application for making the computer in an image processing apparatus execute processing, comprising
- a step of judging a function used by a newly installed application,
- a step of judging functions available in the image processing apparatus, and
- a control step of terminating and/or eliminating one or more of the functions in the image processing apparatus unused by the newly installed application, based on the judgment results in the respective judging steps after the new application is to be installed.

18. A program stored on a computer readable medium for installing an application for making the computer in an image processing apparatus execute processing, comprising
- a step of judging an API used by a newly installed application,
- a step of judging functions available in the image processing apparatus, and
- a control step of terminating and/or eliminating one or more of the functions in the image processing apparatus of the API unused by the newly installed application, based on the judgment results in the respective judging steps after the new application is to be installed.

19. The program for installing an application according to claim 17, for making the computer in an image processing apparatus execute processing, further comprising
- a step of detecting a first resource needed for operation of the application,
- a step of detecting a second resource available for operation of the application, and
- a step of comparing the first resource detected in the first resource-detecting step with the second resource detected in the second resource-detecting step, wherein
- the application is installed as it is in the control step if the second resource is not smaller than the first resource after comparison and the function is terminated and/or eliminated if the second resource is smaller than the first resource.

20. The program for installing an application according to claim 18, for making the computer in an image processing apparatus execute processing, further comprising
- a step of detecting a first resource needed for operation of the application,
- a step of detecting a second resource available for operation of the application, and
- a step of comparing the first resource detected in the first resource-detecting step with the second resource detected in the second resource-detecting step, wherein
- the application is installed as it is in the control step if the second resource is not smaller than the first resource after comparison and the function is terminated and/or eliminated if the second resource is smaller than the first resource.

21. The program for installing an application according to claim 19, for making the computer in an image processing apparatus execute processing, further comprising
- a step of identifying the functional type of the application, wherein,
- if the second resource is smaller than the first resource, a function similar to the functional type of application identified in the identification step that consumes the resource greater than the difference between the first and second resources is terminated and/or eliminated in the control step.

22. The program for installing an application according to claim 19, for making the computer in an image processing apparatus execute processing further comprising
- a step of identifying the functional type of the application, wherein,
- if the second resource is smaller than the first resource, a function similar to the functional type of application identified in the identification step that consumes the resource greater than the difference between the first and second resources is terminated and/or eliminated in the control step.

23. The program for installing an application according to claim 17, wherein the data on the function to be removed is transferred to an external device in the control step.

24. The program for installing an application according to claim 18, wherein the data on the function to be removed is transferred to an external device in the control step.

* * * * *